INVENTOR
WARREN P. MORROW

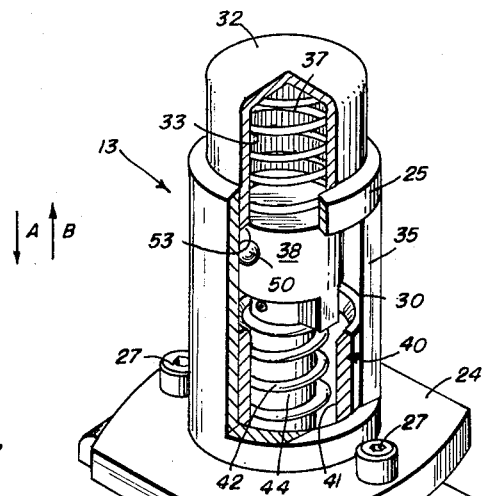
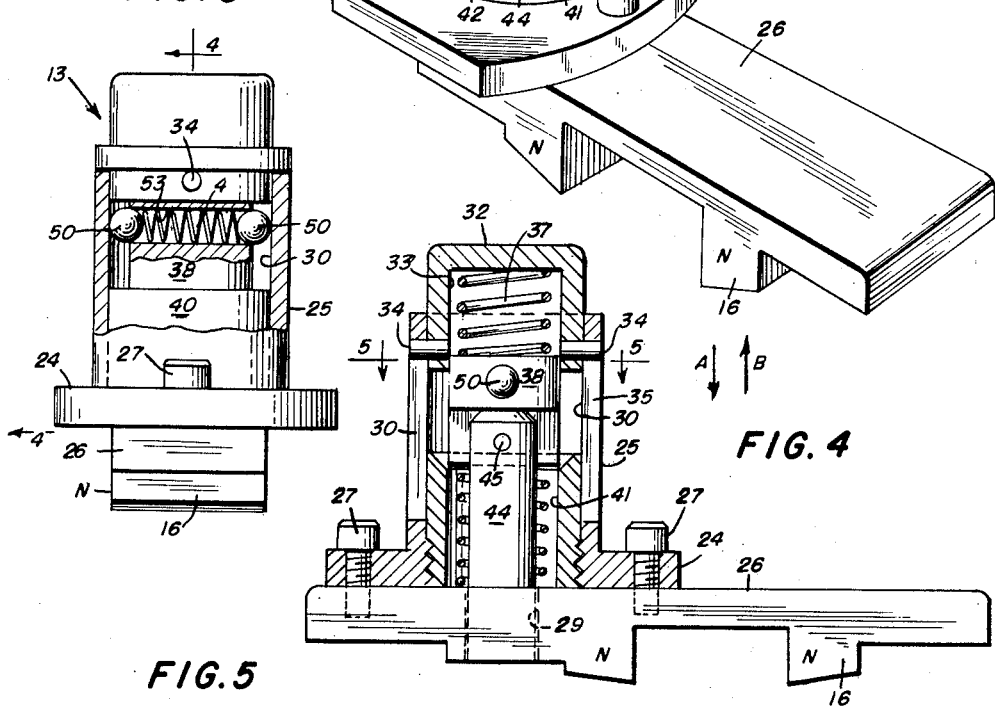
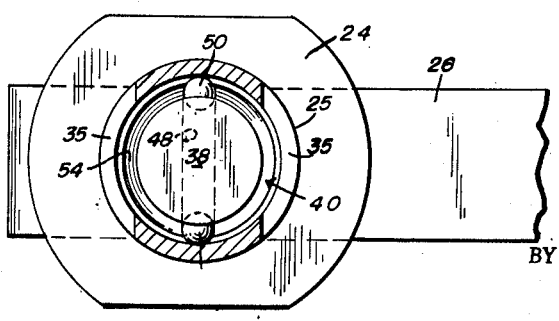

Nov. 6, 1962  W. P. MORROW  3,062,071
ACTUATOR FOR TRIGGERING SYSTEM
Filed Dec. 29, 1959  3 Sheets-Sheet 3

INVENTOR
WARREN P. MORROW

United States Patent Office 3,062,071
Patented Nov. 6, 1962

3,062,071
ACTUATOR FOR TRIGGERING SYSTEM
Warren P. Morrow, Wheaton, Md., assignor to the United States of America as represented by the Secretary of the Army
Filed Dec. 29, 1959, Ser. No. 862,725
1 Claim. (Cl. 74—470)
(Granted under Title 35, U.S. Code (1952), sec. 266)

The invention described herein may be manufactured and used by or for the Government for governmental purposes without the payment to me of any royalty thereon.

This invention relates generally to a triggering system which is capable of producing an electrical pulse for initiating the propellant charge of a rocket when the trigger of the system is depressed.

More specifically, this invention provides an improved actuator for use in a triggering system which produces an alternate snap-action to the soft iron bar of a pulse generator so that the pulse generator will produce an electrical pulse of sufficient magnitude to initiate the propellant charge of a rocket.

Triggering systems, which are used to initiate rockets and missiles, consist basically of a combination of a trigger, a pulse generator, and an actuator. Conventional pulse generators consist of a coil of wire positioned intermediate two opposed permanent magnets and a soft iron bar which is pivotally mounted within the coil. The ends of the iron bar can alternately contact the opposite poles of the permanent magnets so that upon alternate movement of the bar an electrical pulse is generated by the coil.

In order to maximize the magnitude of the pulse produced by the pulse generators, it is important to have an actuator which will provide an alternate snap-action to the soft iron bar. Known prior art actuators utilize overtravel of a rod or plunger to drive by sliding contact the end of the bar. Such actuators are not as reliable as an actuator in which the driving rod is positively connected to the end of the bar. Also prior art actuators do not restore the bar to its initial position and therefore do not produce alternate movement of the bar.

It is an object of this invention to provide an actuator for use in a triggering system which produces alternate snap-action movement of the soft iron bar in the pulse generator, which actuator is positively connected to the bar.

Another object of this invention is to provide an improved actuator which can be used with existing pulse generators without modifying the pulse generator.

The specific nature of the invention, as well as other objects, uses, and advantages thereof, will clearly appear from the following description and from the accompanying drawing, in which:

FIG. 2 is a perspective view of the actuator of this invention with certain parts cut away for purposes of clarity.

FIG. 3 is a partial sectional end view of the actuator shown in FIG. 2.

FIG. 4 is a sectional side view of FIG. 3 taken through section lines 4—4 of FIG. 3.

FIG. 5 is a sectional plan view of the actuator shown in FIG. 4 taken through section lines 5—5 of FIG. 4.

Figure 1:
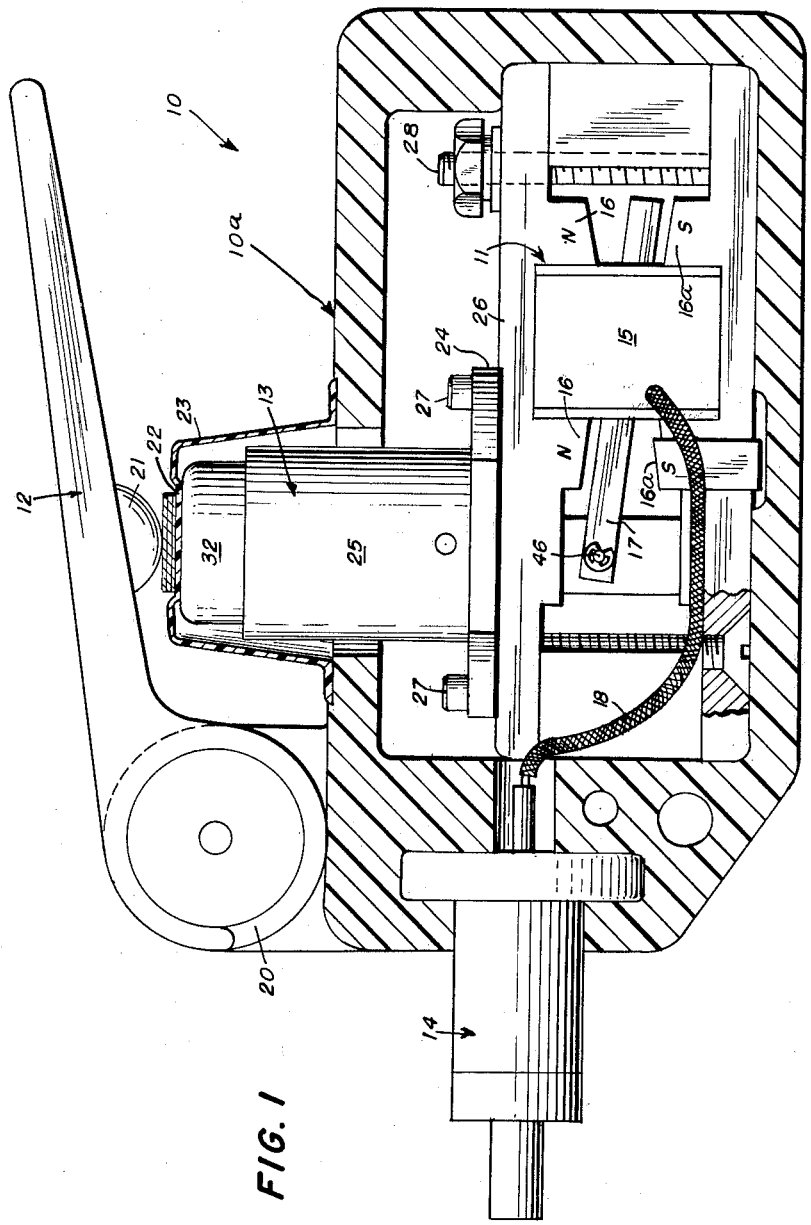
FIG. 1 is a side view of the triggering system of this invention with certain parts shown in section.

Numeral 10 (FIG. 1) designates the triggering system according to this invention. Trigger housing 10a supports a pulse generator 11, trigger 12, actuator 13, initiator 14 and cover 23. Pulse generator 11 is conventional and consists of a coil 15, two opposite permanent magnets 16 and 16a, having polarity as shown, and a soft iron bar 17 pivotally mounted within coil 15. Wires 18 connect coil 15 to initiator 14 which is designed to initiate the propellant charge of a rocket when it receives an electrical pulse from generator 11.

Trigger 12 is pivotally mounted at end 20 to the housing 10a and has a protruding knob 21 which contacts and can depress the flexible end 22 of cover 23. Cover 23, attached to housing 10a, encloses one end of actuator 13. Actuator 13 (FIGS. 2 and 4) provides a unique means for causing rapid alternate snap-action movement to the end of bar 17. This actuator includes a base plate 24 and a cylindrical casing 25. Base plate 24 is mounted upon a plate 26 by means of machine screws 27.

Plate 26 is secured within housing 10a by machine screws 28. A circular opening 29 (FIG. 4) is formed in plate 26. The north poles of permanent magnet 16 extend perpendicularly from plate 26, as shown in FIG. 1.

An opposed pair of south poles 16a are fixed in housing 10a. Cylindrical casing 25 has an axial bore 30 therethrough. Opening 29 and casing bore 30 are substantially coaxial. Protruding from one end of casing 25 is a cup-shaped cap 32 which can be driven in the direction of arrow A (FIG. 2) by knob 21 when trigger 12 is depressed by the operator.

Cap 32 has a coaxial bore 33 therein. Pins 34, riding in axially extending grooves 35 formed in casing 25 prevent movement of cap 32 from casing 25 in the direction of arrow B (FIG. 4). Coil spring 37 is coaxially enclosed in bore 33 (FIGS. 2 and 4) and abuts one end of a substantially cylindrical piston 38. The other end of spring 37 abuts plate 26. The diameter of bore 33 is slightly larger than the diameter of piston 38 so that the piston can compress coil spring 37 and thereby move axially into cap 32. Piston 38 also moves axially within casing bore 30.

Hollow sleeve 40 is coaxially positioned in one end of bore 33 opposite cap 32 and is threadedly connected to base plate 24, as shown in FIG. 4. Bore 41 in sleeve 40 is equal in diameter to sleeve bore 33 and is therefore slightly larger than the diameter of piston 38. Coil spring 42 is substantially enclosed by sleeve bore 41. Rod 44, movable in opening 29 is connected to piston 38 at one end thereof by means of pin 45. The other end of rod 44 is pivotally connected to the end of bar 17 (FIG. 1) by means of pin 46.

Figure 6:
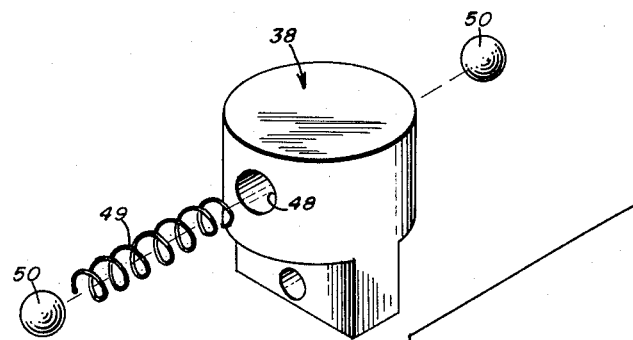
FIG. 6 is an exploded perspective view showing in detail the construction of a piston used in the actuator.

Referring now to FIG. 6, piston 38 is provided with a transverse bore 48 in which is inserted a coil spring 49 and a pair of spheres 50. Transverse bore 48 is substantially diametrical with respect to the axis of piston 38. The diameter of piston 38, the diameter of casing bore 33 and the diameter of spheres 50 are proportioned such that the center of the spheres is intermediate the circular periphery of the piston 38 and the casing bore 30 (FIG. 3). Spring 49 normally retains spheres 50 in this position.

Spheres 50 provide the means for operatively connecting cap 32 to piston 38, since the open end 53 (FIG. 2) of cap 32 is movable axially intermediate piston 38 and casing bore 30 and thereby rides upon spheres 50 substantially centrally thereof. Therefore, when cap 32 is depressed in the direction of arrow A, there is no tendency for the spheres to be pressed by cap 32 into transverse bore 48. Movement of spheres 50 in the direction of arrow A by cap 32 also causes movement of piston 38 in this direction. Cap 32 will continue to drive piston 38 in the direction of arrow A until spheres 50 are moved inwardly so that they no longer have their centers beyond the periphery of piston 38. Movement of spheres 50 inwardly of transverse bore 48 is accomplished by tapered edge 54 formed in the end of sleeve bore 41.

When the spheres 50 ride upon tapered edge 54, they are continually pressed further into transverse bore 48 against spring 49. When the centers of the spheres are no longer beyond the periphery of piston 38, end 53 moving in the direction of arrow A and cooperating with edge 54 will drive the spheres completely into transverse bore 48. Piston 38, which has been compressing coil spring 42 against plate 26 during movement thereof in the direction of arrow A, will be released from its connection by spheres 50 to end 53 and will be driven into bore 33 by the expansion of spring 42 in the direction of arrow B.

Movement of the rod 44 in the direction of arrow A is provided by the operator depressing trigger 12, while movement in the direction of arrow B is provided by spring 42 driving piston 38 into bore 33. As spring 42 extends, the force it exerts against piston 38 lessens, and coil spring 37, which is compressed by piston 38 driving into cap 32, will expand so that the piston is pressed out of cap 32 and back into the initial position, as shown in FIGS. 2 and 4. Trigger 12 will also be restored to its initial position, as shown in FIG. 1, by coil spring 37 expanding and driving cap 32 until pins 34 abut the ends of grooves 35 and prevent any further movement of the cap in the direction of arrow B. The alternate snap-action produced by rod 44 causes a rapid alternate snap-action of the end of bar 17.

Figure 7:
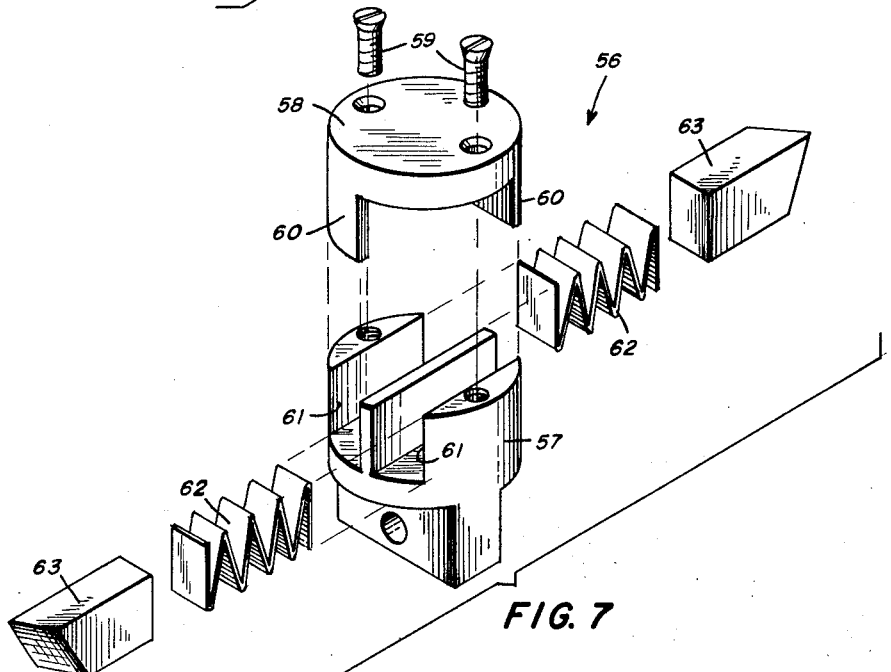
FIG. 7 is an exploded perspective view showing another embodiment of a piston for use with the actuator of this invention.

FIG. 7 illustrates another embodiment of a piston 56 which can be used in the actuator of this invention. Piston 56 is formed of a base 57 and a cap 58 from which extend two diametrically offset legs 60. Base 57 and cap 58 are connected together by screws 59. When the piston 57 is assembled as shown by the exploded view, the opposite ends of slots 61 are blocked by legs 60. Springs 62 are inserted into slots 61 and urge wedge-shaped elements 63 outwardly from piston 56 so that wedge-shaped elements 63 can contact casing bore 30.

It should be evident that even though the trigger 12 remains depressed by the operator, by allowing piston 38 to be driven into cap 32, an alternate snap-action movement is produced. Also, since rod 44 is pivotally fixed to the end of bar 17, constant connection between these two parts is insured.

It will be apparent that the embodiments shown are only exemplary and that various modifications can be made in construction and arrangement within the scope of the invention as defined in the appended claim.

I claim as my invention:

An actuator for providing an alternating snap-action movement to the bar of a pulse generator, said actuator comprising a casing having a bore therethrough, a substantially cylindrical piston axially movable in the casing bore, means connecting said piston to said bar, a coil spring inclosed in said casing bore and adapted to drive said piston therein in one direction, a cap axially movable in one end of said casing bore, means limiting movement of said cap in said one direction, a transverse bore formed in the circular periphery of said piston, a spring and an element slidable in said transverse bore, said last-named spring positioned so as to urge said element outwardly from said transverse bore and into contact with said casing bore, said element when so urged having one portion in said transverse bore and the center thereof intermediate said casing bore and said periphery of said piston, said cap having a bore therein the diameter of which is larger than the diameter of said piston so that the open end of said cap formed by the bore is slidable substantially intermediate the periphery of said piston and said casing bore, said cap thereby contacting said element, and a tapered edge formed in the other end of said casing, said edge extending inwardly of said casing bore a distance sufficient to press said element from engagement with said end of said cap upon said movement of said cap a predetermined distance in the direction opposite to said one direction.

References Cited in the file of this patent
UNITED STATES PATENTS

| | | |
|---|---|---|
| 2,070,121 | Gibson | Feb. 9, 1937 |
| 2,276,885 | Sherlock | Mar. 17, 1942 |
| 2,442,416 | Kulicke et al. | June 1, 1948 |
| 2,481,190 | Binns | Sept. 6, 1949 |
| 2,647,412 | Warmoes et al. | Aug. 4, 1953 |
| 2,688,884 | Warmoes et al. | Sept. 14, 1954 |
| 2,826,091 | Hälsig | Mar. 11, 1958 |
| 2,848,575 | Hahn | Aug. 19, 1958 |
| 2,857,842 | Malm | Oct. 28, 1958 |
| 2,904,661 | Roeser | Sept. 15, 1959 |
| 2,904,707 | Drescher | Sept. 15, 1959 |
| 2,930,910 | Fleming et al. | Mar. 29, 1960 |
| 2,935,894 | Cornado-Arce | May 10, 1960 |